United States Patent
Xu et al.

(10) Patent No.: US 11,057,405 B2
(45) Date of Patent: Jul. 6, 2021

(54) AUTOMATED MALWARE FAMILY SIGNATURE GENERATION

(71) Applicant: Palo Alto Networks, Inc., Santa Clara, CA (US)

(72) Inventors: Zhi Xu, Cupertino, CA (US); Jiajie Wang, San Jose, CA (US); Xiao Zhang, San Jose, CA (US); Wenjun Hu, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 24 days.

(21) Appl. No.: 16/537,403

(22) Filed: Aug. 9, 2019

(65) Prior Publication Data

US 2019/0364062 A1    Nov. 28, 2019

Related U.S. Application Data

(63) Continuation of application No. 15/688,649, filed on Aug. 28, 2017, now Pat. No. 10,432,648.

(51) Int. Cl.
*H04L 29/06* (2006.01)
*G06N 20/00* (2019.01)

(52) U.S. Cl.
CPC ......... *H04L 63/1416* (2013.01); *G06N 20/00* (2019.01); *H04L 63/145* (2013.01)

(58) Field of Classification Search
CPC ... H04L 63/1416; H04L 63/145; G06N 20/00; H04W 12/1208
See application file for complete search history.

(56) References Cited

U.S. PATENT DOCUMENTS

| | | | |
|---|---|---|---|
| 7,640,589 B1 | 12/2009 | Mashevsky | |
| 8,032,489 B2 | 10/2011 | Villella | |
| 8,321,942 B1 | 11/2012 | Chiueh | |
| 8,555,385 B1 | 10/2013 | Bhatkar | |
| 8,788,407 B1 | 7/2014 | Singh | |
| 8,826,439 B1 | 9/2014 | Hu | |
| 8,955,120 B2 | 2/2015 | Antonov | |
| 9,197,665 B1 | 11/2015 | Cabot | |
| 9,245,114 B2 | 1/2016 | Thomas | |
| 9,344,447 B2 | 5/2016 | Cohen | |
| 9,635,039 B1 | 4/2017 | Islam | |
| 9,690,938 B1 | 6/2017 | Saxe | |
| 9,762,593 B1 * | 9/2017 | Kennedy | H04L 63/1416 |

(Continued)

OTHER PUBLICATIONS

Sarvani et al.; "Clustering The Polymorphic Malware Traces", 2017, IEEE, pp. 1-5. (Year: 2017).*

(Continued)

*Primary Examiner* — Matthew Smithers
(74) *Attorney, Agent, or Firm* — Van Pelt, Yi & James LLP

(57) ABSTRACT

The automatic generation of malware family signatures is disclosed. A set of metadata associated with a plurality of samples is received. The samples are clustered. For members of a first cluster, a set of similarities shared among at least a portion of the members of the first cluster is determined. The similarities are evaluated for suitability as a malware family signature. Suitability is evaluated based on how well the similarities uniquely identify the members of the first cluster. In the event the similarities are determined to be suitable as a malware family signature, a signature is generated.

25 Claims, 11 Drawing Sheets

(56) References Cited

U.S. PATENT DOCUMENTS

| | | | |
|---|---|---|---|
| 9,838,410 B2 | 12/2017 | Muddu | |
| 9,992,214 B1* | 6/2018 | Xiao | H04L 63/1416 |
| 9,998,484 B1 | 6/2018 | Buyukkayhan | |
| 10,027,689 B1* | 7/2018 | Rathor | H04L 63/1416 |
| 10,044,750 B2 | 8/2018 | Livshits | |
| 10,432,648 B1* | 10/2019 | Xu | G06N 20/00 |
| 2008/0127336 A1* | 5/2008 | Sun | G06F 21/566 726/22 |
| 2009/0187992 A1* | 7/2009 | Poston | G06F 21/564 726/24 |
| 2011/0041179 A1 | 2/2011 | Staahlberg | |
| 2011/0209196 A1 | 8/2011 | Kennedy | |
| 2011/0271341 A1* | 11/2011 | Satish | G06F 21/562 726/23 |
| 2012/0017275 A1 | 1/2012 | Harmonen | |
| 2012/0072983 A1 | 3/2012 | McCusker | |
| 2012/0079596 A1 | 3/2012 | Thomas | |
| 2012/0210422 A1 | 8/2012 | Friedrichs | |
| 2012/0283361 A1 | 11/2012 | Hansen | |
| 2012/0304244 A1 | 11/2012 | Xie | |
| 2013/0091571 A1 | 4/2013 | Lu | |
| 2013/0097706 A1 | 4/2013 | Titonis | |
| 2013/0191915 A1 | 7/2013 | Antonakakis | |
| 2013/0263266 A1 | 10/2013 | Bojaxhi | |
| 2014/0047544 A1 | 2/2014 | Jakobsson | |
| 2014/0201208 A1 | 7/2014 | Satish | |
| 2015/0026808 A1 | 1/2015 | Perdisci | |
| 2015/0096023 A1 | 4/2015 | Mesdaq | |
| 2015/0180883 A1 | 6/2015 | Aktas | |
| 2015/0244730 A1 | 8/2015 | Vu | |
| 2015/0244733 A1 | 8/2015 | Mohaisen | |
| 2015/0295945 A1 | 10/2015 | Canzanese, Jr. | |
| 2016/0127388 A1 | 5/2016 | Cabot | |
| 2016/0337388 A1 | 11/2016 | Hu | |
| 2016/0381042 A1* | 12/2016 | Zhang | H04L 63/1416 726/24 |
| 2017/0063886 A1 | 3/2017 | Muddu | |
| 2017/0063904 A1 | 3/2017 | Muddu | |
| 2017/0093771 A1 | 3/2017 | Gatti | |
| 2017/0193229 A1* | 7/2017 | RoyChowdhury | G06F 21/564 |
| 2017/0251003 A1 | 8/2017 | Rostami-Hesarsorkh | |
| 2020/0293656 A1* | 9/2020 | Lakhotia | G06F 21/56 |

OTHER PUBLICATIONS

Apel et al., Measuring Similarity of Malware Behavior, Oct. 2009, IEEE, pp. 891-898.

Aresu et al., "Clustering android malware families by http traffic," 2015 10th International Conference on Malicious and Unwanted Software (MALWARE), Fajardo, pp. 128-135, 2015.

Author Unknown, About VirusTotal, downloaded from https_www.virustotal.com_en_about on Feb. 17, 2016.

Author Unknown, Advanced features & tools, VirusTotal, downloaded from https_www.virustotal.com_en_documentation on Feb. 17, 2016.

Author Unknown, File statistics during last 7 days, VirusTotal, downloaded from https_www.virustotal.com_en_statistics on Feb. 17, 2016.

Author Unknown, Frequently Asked Questions, VirusTotal, downloaded from https_www.virustotal.com_en_faq on Feb. 17, 2016.

Bailey et al., Automated Classification and Analysis of Internet Malware, Electrical Engineering and Computer Science Department, University of Michigan, Apr. 26, 2007.

Canto et al., Large scale malware collection: lessons learned, downloaded from http_www.iseclab.netpaperssrds.pdf on Feb. 17, 2016.

Chinmayee Annachhatre, "Hidden Markov Models for Malware Classification". Master's Projects. 328. 2013.

Flaglien et al., "Identifying Malware Using Cross-Evidence Correlation", In: Peterson G., Shenoi S. (eds) Advances in Digital Forensics VII, IFIP Advances in Information and Communication Technology, vol. 361. Springer, Berlin, Heidelberg, 2011.

Jang et al., BitShred: Feature Hashing Malware for Scalable Triage and Semantic Analysis, Oct. 2011.

Kinable et al., Malware Classification based on Call Graph Clustering, Aalto University, Department of Information and Computer Science, Aug. 27, 2010.

Kolosnjaji et al., "Deep learning for classification of malware system call sequences", In Australasian Joint Conference on Artificial Intelligence (pp. 137-149). Springer, Cham. Dec. 2016.

Matthew Asquith, "Extremely scalable storage and clustering of malware metadata", Comput Virol Hack Tech, 12: 49. 2016.

Pai et al., "Clustering for malware classification." 2016.

Perdisci et al., Behavior Clustering of HTTP-Based Malware and Signature Generation Using Malicious Network Traces, College of Computing, Georgia Institute of Technology, Apr. 2010.

Rafique et al., "Firma: Malware clustering and network signature generation with mixed network behaviors." International Workshop on Recent Advances in Intrusion Detection. Springer, Berlin, Heidelberg, 2013.

Shen et al., Detect Android Malware Variants using Component Based Topology Graph, 2014, IEEE 13th International Conference on Trust, Security, and Privacy in Computing and Communications, pp. 406-413.

Teufl et al., "Malware detection by applying knowledge discovery processes to application metadata on the Android Market (Google Play)". Secur. Commun. Netw. 9(5), 389-419, 2016.

Usha Narra, "Clustering versus SVM for Malware Detection" Master's Projects. 405. 2015.

West et al., "Metadata-driven threat classification of network endpoints appearing in malware", in International Conference on Detection of Intrusions and Malware, and Vulnerability Assessment (pp. 152-171). Springer, Cham. Jul. 2014.

Ye et al., Automatic Malware Categorization Using Cluster Ensemble, Proceedings of the 16th ACM SIGKDD International conference on Knowledge discovery and data mining, Jul. 2010.

Zhong et al., A Malware Classification Method Based on Similarity of Function Structure, 2012, IEEE/IPSJ 12th International Symposium on Applications and the Internet pp. 256-261.

* cited by examiner

```
.smali
---android
------annotation
---com
------android
---------vending       ⎫
------------billing    ⎬ 502
------google           ⎪
---------ads           ⎪
---------android       ⎪
------------gcm        ⎭
------h2               ⎫
---------org           ⎬ 504
------------springframework
------------util       ⎭
------jumptap          ⎫ 506
---------adtag         ⎭
------greystripe ⟵ 508
------burstly ⟵ 510
------flurry ⟵ 512
------inmobi ⟵ 514
------millennialmedia ⟵ 516
------ACMEGames ⟵ 518
---org                 ⎫ 520
------springframework  ⎭
---------codehaus      ⎫ 522
------------jackson    ⎭
------sneakystuff ⟵ 524
```

```
602 —
{
  "_index" : "apkscannew2",
  "_type" : "type1",
  "_id" : "616b13d0a668d904a60f7e6e18b1947661499127e5ed7b860b66b28952befc",
  "_score" : 0.08944272,
  "fields" : {
    "android_manifest.package_name" : [
      "org.b4d40ad47bf8a7c91a86e"
    ],
    "android_manifest.service.name" : [
      "org.b4d40ad47bf8a7c91a86e.RService"  ← 606
    ],
    "android_manifest.receiver.intent_filter.action" : [
      "android.intent.action.BOOT_COMPLETED",   ← 610
      "android.provider.Telephony.SMS_RECEIVED",
      "android.app.action.DEVICE_ADMIN_ENABLED"
    ],
    "dex.strings" : [
      "Web",
      "xBot",   ← 614
      "21"
    ],
    "android_manifest.receiver.name" : [
      "org.b4d40ad47bf8a7c91a86e.BootHandler",   ← 618
      "org.b4d40ad47bf8a7c91a86e.SMSHandler",
      "org.b4d40ad47bf8a7c91a86e.AdminReceiver"
    ]
  }
},
```

```
604 —
{
  "_index" : "apkscannew2",
  "_type" : "type1",
  "_id" : "d082ee8619e176467ce8b8a62c2d2866d611d426dd41363416f5f5926c451850",
  "_score" : 0.08944272,
  "fields" : {
    "android_manifest.package_name" : [
      "com.atsral.core"
    ],
    "android_manifest.service.name" : [
      "com.atsral.core.RunService"   ← 608
    ],
    "android_manifest.receiver.intent_filter.action" : [
      "android.intent.action.BOOT_COMPLETED",   ← 612
      "android.provider.Telephony.SMS_RECEIVED",
      "android.app.action.DEVICE_ADMIN_ENABLED",
      "SMS_SENT",
      "SMS_DELIVERED"
    ],
    "dex.strings" : [
      "Huawei|Y221-U12 | HWY221-U | HUAWEI Y221-U12",
      "xBot",   ← 616
      "LGE|Optimus F3 | fx3 | LG-LS720"
    ],
    "android_manifest.receiver.name" : [
      "com.atsral.core.OnBootHandler",   ← 620
      "com.atsral.core.SMSHandler",
      "com.atsral.core.AdminReceiver",
      "com.atsral.core.sms.SentReceiver",
      "com.atsral.core.sms.DeliveredReceiver"
    ]
  }
},
```

```
<?xml version="1.0" encoding="utf-8"?>
<manifest xmlns:android="http://schemas.android.com/apk/res/android"
    package="org.sergez.splayer"
    android:versionCode="37"
    android:versionName="2.1">
    <uses-sdk android:minSdkVersion="8" android:targetSdkVersion="19"/>
    <uses-permission android:name="android.permission.READ_EXTERNAL_STORAGE"/>
    <application
        android:icon="@drawable/ic_launcher"
        android:label="@string/app_name"
        android:debuggable="false">
        <activity
            android:name=".activity.SimplePlayerActivity"
            android:label="@string/app_name"
            android:theme="@style/Theme.Sherlock">
            <intent-filter>
                <action android:name="android.intent.action.MAIN"/>
                <category android:name="android.intent.category.LAUNCHER"/>
            </intent-filter>
        </activity>
        <service android:name=".service.SimplePlayerService" android:enabled="true/>
    </application>
</manifest>
```

802 → package, versionCode (804), versionName

FIG. 8

908
     902    906          /
       \     \          /
582275, 14262:9.6758795 56365:7.2073054 60236:376.4984 137268:7.1535287 154711:
8.048931 248881:7.1535287 297113:7.346377 299899:30.790417 301119:7.3495564 30
4773:11.018567 310099:7.1535287 317954:7.246747 446772:7.16936 470665:7.340048
484371:9.960889 516473:10.099045 581892:7.1535287, <u>368d71946fbaf9a196337b93e70</u>
<u>d9eaf66b669d582b1427187ba7e89e2500c87</u>
                                                              \
                                                              904

FIG. 9A

952 —(0, 1d250b854621fcc802caac7512e22fc7a8edfce63b589e37a9c3324dbc8011a1)
954 —(0, 47395531977e8cdc31a0e8bfb995a1aa054baaef829520c3b8050f167d96d9ae)
956 —(0, 6c704bf470862fbe85bcf3844aff233eda2f9ec44f039efa1add47ea7e477fed)

• • •

958 —(360, f0d568472dbdb88b2b68e13808ed62484924f54174f9165489270e299b30ddfd)
960 —(360, 816e7082a99a18bf4233d0ca52fa2eb4ef899ff0fb2a39b3948f209248ff4d9a)
    (363, b7c27e897da07eeb4129cd9cc1ddf2f27085fa694e596c25b4b3da820e1cc589)
    (363, e1149c5902617a0cbdd26a3cb94fa97309ee8830a1c0d567465c8339afa6cda3)
    (363, aee17b13a1977c7986bd2a40dec0a76e497123770a324023a20a1b05bd132950)
    (365, dce4ad484d62b2130e4c862baa76221d8b95aa09f71e843377d26fb97605fb6f)
    (365, 989e8a4bdae9d64cea47ca96cb9e35d0be248f4f86bfbd4525476d3f008abdfd)
    (365, 1c79d09a2474ade80fb0699598c1cd87d6483a06d36acbc6e99c2a051460b1fc)

• • •

(998, e95337421c29c4de5858bb28bd7c1537cb5c4bc80ce89022349422dc1a4e34ef)
    (998, 92022bfa1ab84b5d45e8694c7e9062a035364ca3f0b3715c8aa2b6acf572fc33)
    (998, 3d96e32c8ca4a71f18564a539fef992055abe4dbb203e3ec124f5a19435f8cce)
    (998, 2b14f376e0613d382bc37b9ad9ed9a819ec8fd8c935258fe0f4d1f896b5d2084)

```
{
 "_id": "217438270adcd9a9f510fbbef6b1b8f6be42831972",
 "fields": {
  "android_manifest.service.name": [
   "com.passionteam.lightdd.CoreService"
  ],
  "android_manifest.activity.name": [
   "com.japanese.hot.girl.SexyImages",
   "com.japanese.hot.girl.ShowImage"
  ],
  "android_manifest.receiver.name": [
   "com.passionteam.lightdd.Receiver"
  ],
  "android_manifest.package_name": [
   "com.japanese.hot.girl"
  ],
  "certificate.issuer": [
   "CN=Unknown, OU=Unknown, O=Unknown, L=Unknown,
  ],
  "certificate.owner": [
   "CN=Unknown, OU=Unknown, O=Unknown, L=Unknown,
  ]
 }
}
```

```
{
 "_id": "1b3238d3fb2ef5fb41b06c9f3e58721e34d2898",
 "fields": {
  "android_manifest.service.name": [
   "com.passionteam.lightdd.CoreService"
  ],
  "android_manifest.activity.name": [
   "com.socialnmobile.flashlight.Flashlight",
   "com.admob.android.ads.AdMobActivity"
  ],
  "certificate.owner": [
   "0=tesi"
  ],
  "android_manifest.receiver.name": [
   "com.passionteam.lightdd.Receiver"
  ],
  "android_manifest.meta_data.name": [
   "ADMOB_PUBLISHER_ID",
   "ADMOB_INTERSTITIAL_PUBLISHER_ID"
  ],
  "android_manifest.package_name": [
   "com.socialnmobile.super.flashlight"
  ],
  "certificate.issuer": [
   "0=tesi"
  ]
 }
}
```

FIG. 10

```
1102 ─ "match": {
         "android_manifest.activity.name": [ ],
         "android_manifest.meta_data.name": [ ],
         "android_manifest.package_name": [ ],
         "android_manifest.receiver.name": [
             "com.passionteam.lightdd.Receiver"
         ],
         "android_manifest.service.name": [
             "com.passionteam.lightdd.CoreService"
         ],
         "certificate.issuer": [ ],
         "certificate.owner": [ ],
         "included_files.relative_path": [
             "META-INF/MANIFEST.MF"
         ],
         "libs.name": [ ]
     },
```

```
1104 ─ "postfix": {
         "android_manifest.activity.name": [ ],
         "android_manifest.meta_data.name": [ ],
         "android_manifest.package_name": [ ],
         "android_manifest.receiver.name": [ ],
         "android_manifest.service.name": [ ],
         "certificate.issuer": [ ],
         "certificate.owner": [ ],
         "included_files.relative_path": [ ],
         "libs.name": [ ]
     },
```
─ 1108

```
1106 ─ "prefix": {
         "android_manifest.activity.name": [ ],
         "android_manifest.meta_data.name": [ ],
         "android_manifest.package_name": [ ],
         "android_manifest.receiver.name": [ ],
         "android_manifest.service.name": [ ],
         "certificate.issuer": [ ],
         "certificate.owner": [ ],
         "included_files.relative_path": [ ],
         "libs.name": [ ]
     },
```

FIG. 11

AUTOMATED MALWARE FAMILY SIGNATURE GENERATION

CROSS REFERENCE TO OTHER APPLICATIONS

This application is a continuation of co-pending U.S. patent application Ser. No. 15/688,649 entitled AUTOMATED MALWARE FAMILY SIGNATURE GENERATION filed Aug. 28, 2017 which is incorporated herein by reference for all purposes.

BACKGROUND OF THE INVENTION

Malware is a general term commonly used to refer to malicious software (e.g., including a variety of hostile, intrusive, and/or otherwise unwanted software). Example uses of malware include disrupting computer and/or computer network operations, stealing proprietary information (e.g., confidential information, such as identity, financial, and/or intellectual property related information), and/or gaining access to private/proprietary computer systems and/or computer networks. Malware can be in the form of code, scripts, active content, and/or other software. One particular challenge in identifying and mitigating malware is that malware authors often create new malware and/or modify existing malware (e.g., using techniques such as polymorphism) to evade signature-based detection measures. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 5 illustrates an example representation of .smali information for an application.

FIG. 6 illustrates information obtained for two Android samples.

FIG. 8 illustrates an example of a portion of metadata for an Android sample.

FIG. 9A illustrates an example row of a sparse vector list.

FIG. 9B illustrates example results of clustering samples.

FIG. 10 illustrates metadata for two Android samples.

FIG. 11 illustrates different ways of expressing what portion of metadata is shared across cluster member samples.

DETAILED DESCRIPTION

Figure 1:
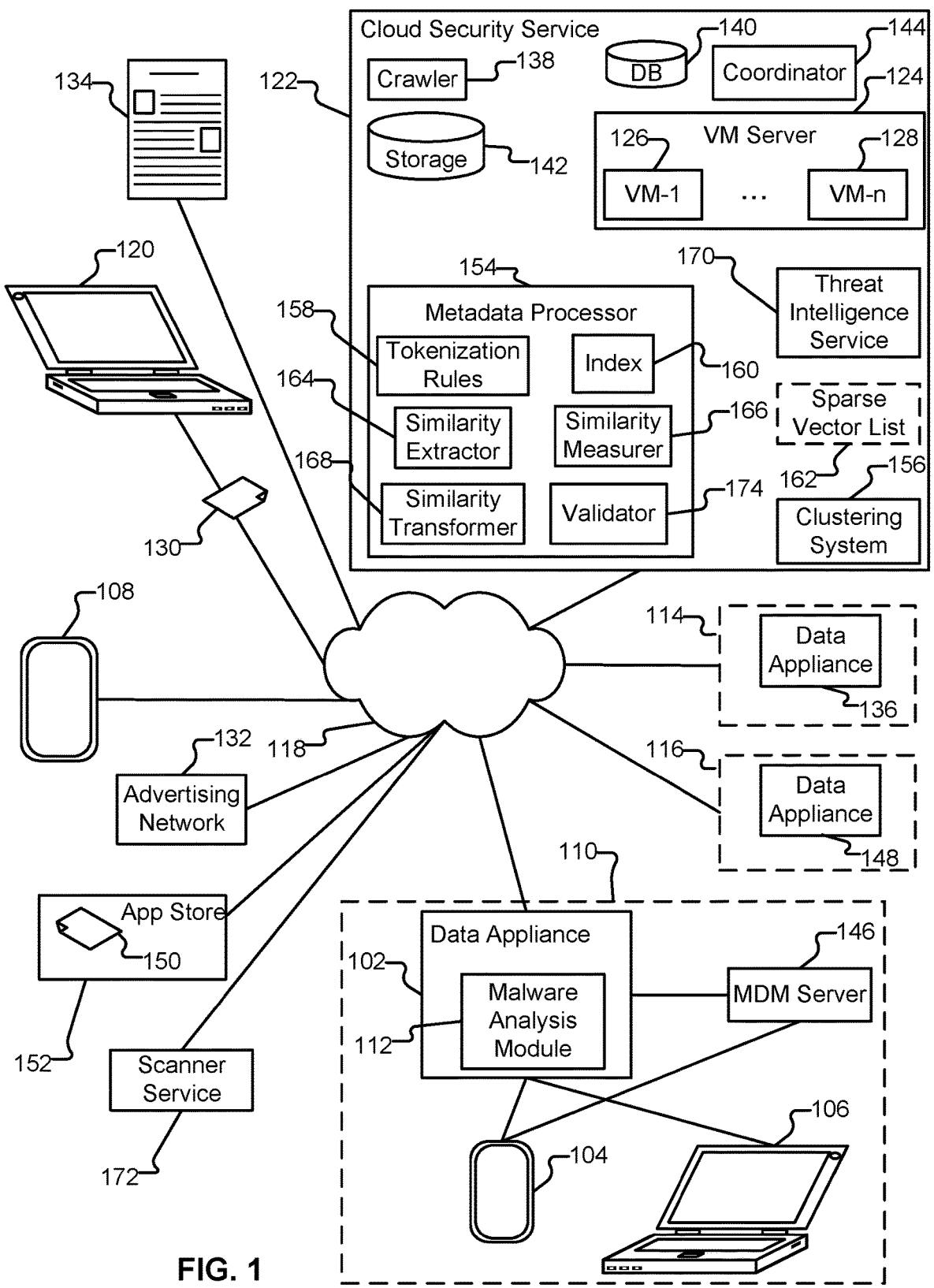
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

FIG. 1 illustrates an example of an environment in which malicious applications ("malware") are detected and prevented from causing harm. As will be described in more detail below, malware classifications (e.g., as made by cloud security service 122) can be variously shared and/or refined among various entities included in the environment shown in FIG. 1. And, using techniques described herein, devices, such as endpoint client devices 104 and 106, can be protected from such malware.

One example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Yet another example of malware is a desktop application that collects and reports to a remote server the end user's location (but does not offer location-based services to the user, such as a mapping service). Other forms of malware can also be detected/thwarted using the techniques described herein (e.g., ransomware). And, the techniques described herein can be used to classify a variety of types of applications (in addition to or instead of classifying malware).

The term "application" is used throughout the Specification to collectively refer to programs, bundles of programs, manifests, packages, etc., irrespective of form/platform. An "application" can be a standalone file (e.g., a calculator app having the filename "calculator.apk") and can also be an independent component of another application (e.g., a mobile advertisement SDK embedded within the calculator app). "Malware" as used herein refers to an "application" (also referred to as a "sample") that engages in behaviors, whether clandestinely or not, of which a user does not approve/would not approve if fully informed (whether illegal or not). Examples of malware include Trojans, viruses, rootkits, spyware, adware, hacking tools, keyloggers, personal information collectors, etc. While examples described herein generally involve mobile applications (e.g., those executed on a mobile phone), the techniques described herein can also be used in conjunction with other platforms (e.g., desktop applications, gaming platform applications, embedded systems applications, etc.). Accordingly, while various examples described herein refer to Android .apk files, it is to be understood that the techniques described herein can be used with respect to other kinds of platforms and/or other applications, such as iOS applications, Windows PE files, Adobe Acrobat PDF files, etc. Similarly, while signatures are described herein as being generated for malware families, techniques described herein can also be used in various embodiments to generate signatures for other kinds of applications (e.g., adware, goodware, etc.).

Suppose a nefarious individual wishes to propagate malware (an example of which is malware 130) via a laptop 120 to end users. A variety of approaches can be used by the nefarious individual. As one example, the individual can upload malware 130 to a software distribution platform such as platform 152 (also referred to as an "an app store"). The nefarious individual hopes that unsuspecting users of platform 152 (e.g., any of applicable client devices 104-108) will download the malicious application 130 from platform 152 and install it on their devices. Example embodiments of platform 152 include Google Play, iOS App Store, BlackBerry World, Windows Phone Store, Windows Store, and Amazon Appstore. Additional examples of software distribution platforms include third party software distribution platforms, such as the Baidu App Store, GetJar, and Handango.

Another way the nefarious individual can attempt to propagate malware is by posting it on a message/forum site, such as website 134. In this scenario, the nefarious individual again hopes that unsuspecting users of website 134 will download and install the malicious application 130. Yet another way for the nefarious individual to attempt to propagate malware 130 is to attach it to an email message and hope that the recipient (e.g., the owner of client device 104) will open the attachment and install the program. Yet another way for the nefarious individual to attempt to propagate malware 130 is to include it in an advertising company's advertising network (e.g., advertising network 132) and hope that the user will install the promoted program. Yet another way for the nefarious individual to attempt to propagate malware 130 is to include a download link for the malware within a phishing SMS message or email message and hope that the recipient (e.g., the owner of client device 104) will download the malware and install the program. Yet another way for the nefarious individual to attempt to propagate malware 130 is to use another piece of malware that is already installed on the target client device (e.g., client device 104) and let the already installed malware install the new malware 130 on the client device.

In the example shown in FIG. 1, client device 108 runs an Android-based operating system and is owned by an individual hereinafter referred to as "Alice." Also included in FIG. 1 are client devices 104 and 106, which are a phone and a laptop (respectively) present in an enterprise network 110. Client device 108 is outside enterprise network 110, and client device 106 runs Windows 10.

Data appliance 102 is configured to enforce policies regarding communications between clients such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, data appliance 102 is also configured to enforce policies with respect to traffic that stays within enterprise network 110. In some embodiments, other devices are included in enterprise network 110, such as a mobile device management (MDM) server 146, which is in communication with data appliance 102. As shown in FIG. 1, MDM server 146 communicates with mobile devices (e.g., 104) to determine device status and to report (e.g., periodically) such mobile device status information to data appliance 102. MDM server 146 can be configured to report the presence of malicious applications installed on devices such as client 104, and/or can be configured to receive indications of which applications are malicious (e.g., from data appliance 102, from cloud security service 122, or combinations thereof). In some embodiments, data appliance 102 is configured to enforce polices against client device 104 based on information received from MDM server 146. For example, if client device 104 is determined to have malware installed on it (or other unapproved types of applications), data appliance 102 (working in cooperation with MDM server 146) can deny client device 104 access to certain enterprise resources (e.g., an Intranet) while allowing client device 106 (which does not have malware installed upon it) access to those resources.

Figure 2:
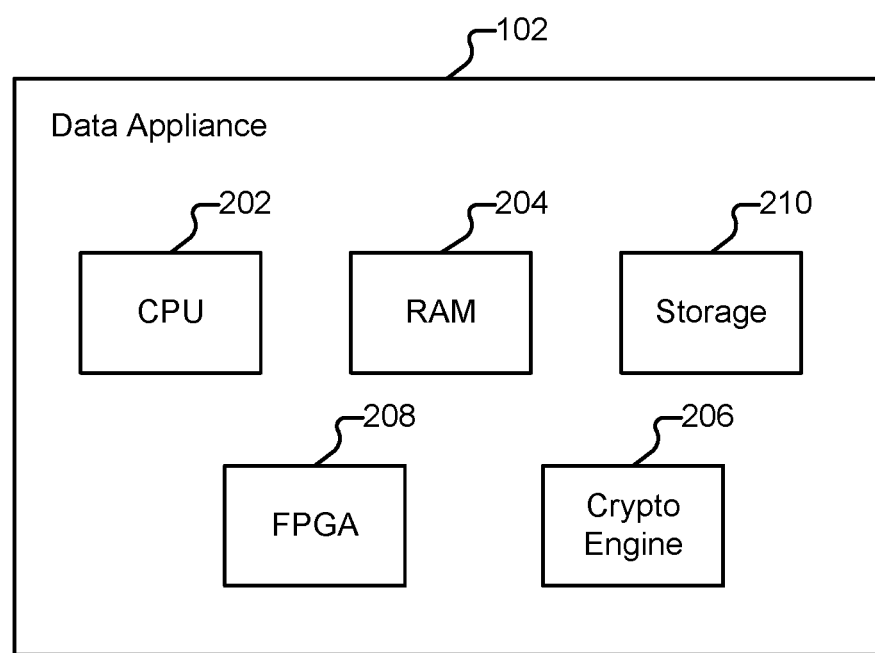
FIG. 2 illustrates an embodiment of a data appliance.

An embodiment of a data appliance is shown in FIG. 2. The example shown is a representation of physical components that are included in data appliance 102, in various embodiments. Specifically, data appliance 102 includes a high performance multi-core CPU 202 and RAM 204. Data appliance 102 also includes a storage 210 (such as one or more hard disks), which is used to store policy and other configuration information, such as URL categorization information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Data appliance 102 can take a variety of forms. For example, data appliance 102 can be a single, dedicated device (e.g., as shown), and can also be a set of devices. The functionality provided by data appliance 102 can also be integrated into or executed as software on a general purpose computer, a computer server, a gateway, and/or a network/routing device. For example, in some embodiments, services provided by data appliance 102 are instead (or in addition) provided at least partially to client device 104 (or client device 106) by an agent or other software executing on client device 104 (or client device 106).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be added to appliance 102 as applicable.

Returning to the environment of FIG. 1, suppose data appliance 102 intercepts an email sent by laptop 120 to client device 104 to which a copy of app 130 has been attached. As an alternate, but similar scenario, data appliance 102 could intercept an attempted download by client device 104 of file 150 from platform 152. In either scenario, data appliance 102 determines whether a signature for the download (e.g., the attachment that includes malware 130, or file 150) is present on data appliance 102. A signature, if present, can indicate that the file (also referred to herein as a "sample") is known to be safe, and can also indicate that the attachment is known to be malicious. If no signature for the attachment is found, in some embodiments, data appliance 102 is configured to provide the attachment (e.g., malware 130) to a malware analysis module 112 for real-time analysis. As will be described in more detail below, a combination of static and dynamic analysis can be performed on the application to determine whether it is malicious, and/or to otherwise classify it. The static and dynamic analysis can be performed taking into account the various types of components used to author the application, as well as its execution context. Further, as will be described in more detail below, results of the static/dynamic analysis can be used to help cluster samples (e.g., into malware families). As will also be described in more detail below, results of sample clustering can be used by a variety of elements depicted in FIG. 1. For example, knowledge that particular samples belong to the same family, and what commonalties the family members share, can be used by cloud security service 122 to help identify new samples as belonging to a particular family.

As mentioned above, analysis of malware 130 can be performed on premise (e.g., at the enterprise). For example, the analysis can be performed by a malware analysis module 112 included in data appliance 102. Instead of or in addition to on-premise analysis, data appliance 102 can also send a copy of malware 130 to cloud security service 122 for analysis. Further, cloud security service 122 can also (or instead) obtain copies of applications for evaluation from sources other than data appliance 102. As one example, cloud security service 122 can include a crawler 138 configured to periodically crawl platform 152 (or other sources of apps, such as website 134), looking for new or updated applications. Such applications can then be analyzed by cloud security service 122. In some embodiments, platform 152 (and/or website 134) makes copies of applications available to cloud security service 122 via an Application Programming Interface (API) made available by cloud security service 122, instead of or in addition to crawler 138 obtaining such copies. Further, embodiments of cloud security service 122 and/or malware analysis module 112 can also be incorporated into platform 152 (and/or website 134).

Copies of received samples (e.g., awaiting analysis) are stored in storage 142 and analysis is commenced (or scheduled, as applicable). As will be described in more detail below, results of the analysis (and additional information pertaining to the applications) are stored in database 140, as is, in some embodiments, information pertaining to components incorporated into various applications.

Cloud security service 122 can comprise one or more dedicated commercially available hardware servers (e.g., having multi-core processor(s), 8G+ of RAM, gigabit network interface adaptor(s), and hard drive(s)) running typical server-class operating systems (e.g., Linux). In various embodiments, cloud security service 122 is implemented across a scalable infrastructure comprising multiple such servers, solid state drives, and/or other applicable high-performance hardware. Cloud security service 122 can comprise several distributed components, including components provided by one or more third parties. For example, portions or all of cloud security service 122 can be implemented using the Amazon Elastic Compute Cloud (EC2) and/or Amazon Simple Storage Service (S3). Further, as with data appliance 102, whenever cloud security service 122 is referred to as performing a task, such as storing data or processing data, it is to be understood that a sub-component or multiple sub-components of cloud security service 122 (whether individually or in cooperation with third party components) may cooperate to perform that task. As one example, cloud security service 122 can optionally perform its analysis in cooperation with one or more virtual machine (VM) servers, such as VM server 124.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers cloud security service 122, but may also be provided by a third party. As one example, the virtual machine server can rely on EC2, with the remainder portions of cloud security service 122 provided by dedicated hardware owned by and under the control of the operator of cloud security service 122. As will be explained in more detail below, VM server 124 is configured to provide one or more virtual machines 126-128 for emulating mobile (or other) devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of cloud security service 122, such as coordinator 144.

In various embodiments, cloud security service 122 makes available the results of its analysis of samples via a list of signatures (and/or other identifiers) to data appliance 102 (and/or to MDM server 146) as part of a subscription. For example, cloud security service 122 can periodically send a content package that identifies malware apps (e.g., daily, hourly, or some other interval, and/or based on an event based on a policy). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to cloud security service 122 by data appliance 102, and can also cover signatures of all malware known to cloud security service 122 (or subsets thereof, such as just mobile malware but not other forms of malware (e.g., PDF malware)).

In various embodiments, cloud security service 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of cloud security service 122. Other types of entities can also make use of the services of cloud security service 122. For example, a carrier providing cellular service to client device 108 can contract with cloud security service 122 to analyze applications which client device 108 attempts to download. As another example, the owner of client device 108 can contract with cloud security service 122 to analyze applications. As yet another example, an operator of platform 152 (and/or website 134) can contract with cloud security service 122 to analyze applications (e.g., for a fee).

In the event app 130 is determined to be malicious (e.g., whether by cloud security service 122 or by data appliance 102), data appliance 102 can be configured to automatically block the file download based on the analysis result. Further, a signature can be generated for malware 130 and distributed (e.g., to other data appliances such as data appliances 136 and 148) to automatically block future file transfer requests to download the file determined to be malicious.

In the following section, approaches to performing sample analysis (e.g., static and dynamic analysis) of samples will be described. As will be described in more detail below, information gained through static/dynamic analysis can be used to help cluster samples (e.g., into malware families). As will also be described in more detail below, such clustering information can be used to inform the processing performed by embodiments of various components depicted in FIG. 1 (e.g., improving detection capabilities of data appliances 102, 136, and 148; improving detection capabilities of static analysis engine 306; etc.).

In various embodiments, cloud security service 122 is configured to collaborate with one or more third-party services. As one example, cloud security service 122 can provide malware scanning results (and other information, such as suspected family membership, family naming information, etc.) to a third-party scanner service (an example of which is VirusTotal). Cloud security service 122 can similarly incorporate information obtained from a third-party scanner service (e.g., maliciousness verdicts from entities other than cloud security service 122) into its own information (e.g., information stored in database 140 or another appropriate repository of information).

Analyzing New Samples Using Static/Dynamic Analysis

Overview

Figure 3:
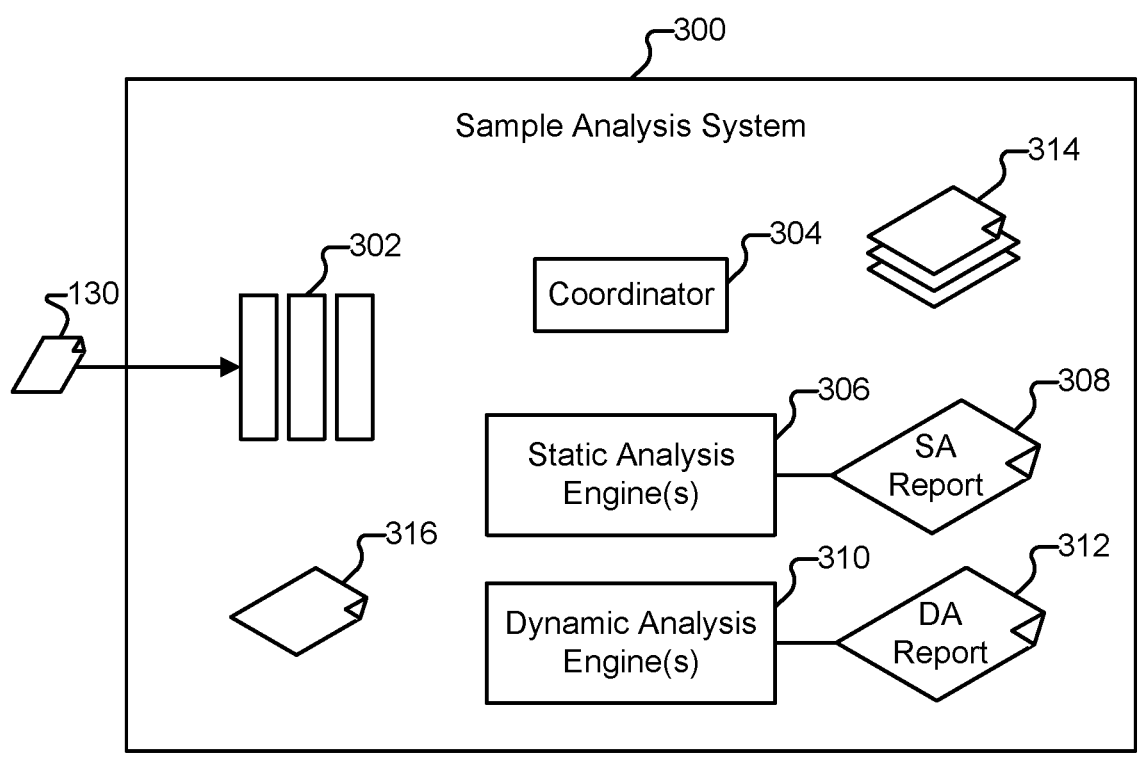
FIG. 3 illustrates an example of logical components included in a system for performing static and dynamic sample analysis on a sample.

FIG. 3 illustrates an example of logical components included in a system for performing static and dynamic sample analysis on a sample. As explained above, analysis system 300 can be implemented using a single device. For example, the functionality of analysis system 300 can be implemented on data appliance 102 which includes a malware analysis module 112. Analysis system 300 can also be implemented, collectively, across multiple distinct devices. For example, the functionality of analysis system 300 can be provided by cloud security service 122.

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or cloud security service 122). Examples of information included in collection 314 are: URLs of known malicious websites; URLs of known safe websites; URLs (or other identifiers, such as IP addresses) of known C&C domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries. In various embodiments, collection 314 includes a list (or other appropriate data structure) of sensitive code segments.

As will be described in more detail below, in various embodiments, analysis system 300 is configured to perform a two part analysis on applications, including by performing static and dynamic analysis. The two-phase approach helps improve the accuracy of malware detection, while lowering the false positive rate of mislabeling benign application files as malware (e.g., due to harmless but poor programming techniques on the part of the application's author; due to including a common third party library, such as a legitimate advertising library, that requires permissions not otherwise used by the application; and/or due to legitimate uses of sensitive API calls).

During a static analysis portion of the analysis, the sample (also referred to herein as a "host application" or "host APK") is reversed into a "reversed host application" (also referred to herein as a "reversed host APK"). The reversed host application is (in some embodiments) a directory structure (e.g., including one or more subdirectories) of source (and/or intermediate) code and resource files reversed from a given host application. In various embodiments, during static analysis, the structure of the APK file is examined (e.g., by reading the META-INF/CERT. SF) and parsing the DEX file format for classes.dex is performed.

Static analysis can be used to identify the presence of "sensitive code segments" in the APK. A sensitive code segment is one or more API calls (or other code elements) that involve a potentially sensitive/exploitable permission/resource. Examples in a mobile device context include sending SMS messages, capturing video, reading contacts, reading device location, reading device phone number, and installing a package. Other examples of sensitive code segments include (e.g., for Windows applications) checking the system registry, and (e.g., for Linux applications) attempting to modify init.rc.

The presence of a sensitive code segment in an APK indicates that the APK can potentially take a sensitive action/perform a sensitive function. A sensitive code segment can be present in an APK for a variety of reasons. As a first reason, the sensitive code segment may be included as a legitimate (and desired) behavior of a benign application. For example, a video editing application may legitimately require the ability to record video, and would accordingly include a sensitive code segment providing such functionality. A malicious application can also include a sensitive code segment. For example, a malicious flashlight application might be authored to include a sensitive code segment that allows the flashlight application to determine an unsuspecting device owner's location.

The mere presence of one or more sensitive code segments in an application is generally not dispositive of whether or not an application is malicious. As mentioned above, there are often legitimate (and desirable) reasons for such code segments to be included in an application. For example, a contact manager application will legitimately require access to a user's contacts in order to function. As another example, suppose an application author includes in an application a library (or toolkit, or other code, as applicable) that makes available a variety of functions (including sensitive ones). The application itself may not make use of all (or any) of the sensitive code segments included in the library. Flagging all applications which include sensitive code segments as malicious will generally result in a large number of false positives. In various embodiments, analysis system 300 evaluates the context in which a sensitive code segment is included in an application and uses the contextual information to help determine whether the application is malicious or not. Further, information collected by analysis system 300 can be exported as "evidence" to support verdicts about applications. For example, rather than merely labeling a particular application as "benign" or "malicious,"

evidence for reaching that verdict can be provided, such as, "malicious: application exports contacts without user interaction."

During static analysis, a call graph can be constructed and examined with respect to sensitive code segments. In particular, a determination can be made about how sensitive code segments can potentially be called (if at all) by an executing application, and heuristics can be employed to help determine whether an application is malicious or not. As one example, suppose an application includes a sensitive code segment, but according to the call graph the sensitive code segment is never called. As explained above, one reason for this is that the sensitive code segment is included in an SDK that is incorporated into the application, but the sensitive code segment itself is not used by the application. Such a non-executable sensitive code segment can be considered dead code, and the presence of the sensitive code in the application can be treated as benign accordingly. As another example, where the call graph for an application does indicate that sensitive code segments are called, the call path(s) to the sensitive code segment can be examined. If the sensitive code segment is only called in response to a user interaction, an assumption can be made that the user was aware of (and/or consented to) the sensitive behavior. If the sensitive code segment is instead called on startup (or otherwise executed without user input), an assumption can be made that the sensitive behavior is being hidden from the user (e.g., nefariously). A verdict (e.g., benign or malicious) can be assigned to each path to the sensitive code segment in the application during static analysis (e.g., based on how the code segment is called).

In various embodiments, during static analysis, the code is aggregated into libraries based on the developers of and/or functionality provided by the code. The libraries can be grouped (e.g., based on whether a given library or code is provided by the developer, a commonly used third party library, or unrecognized). As one example, a mobile game application will typically include code written by the game's developer (e.g., providing the logic of how the game operates), as well as third party code. Examples of such third party code include an animation library to assist in rendering graphics, an advertising library that allows users of the game to play for free in exchange for viewing advertisements (with the game developer receiving a cut of the advertising revenue), and a payment system library to collect "in-app" payments from users. Other examples of third party code/libraries include those that provide accessorial functionalities such as mobile advertisements, usage statistics, encryption/coding, and social networking. The third party code typically is not directly related to the host application and in some cases may run autonomously from the host application after installation. At least some of these libraries might be very common (e.g., many applications available from platform 152 might incorporate the same third party advertising library). Any such commonly used libraries (e.g., provided by well known vendors) incorporated into an application are included in what is referred to herein as the "common" group.

Analysis of a given application can be made more efficient by focusing the analysis on those portions of an application that are not common across large numbers of applications (i.e., the portions not belonging to the "common" group). An application's components which are not included in the "common" group are referred to herein as belonging to the "uncommon" group of code/libraries. The "uncommon" group can further be subdivided into the "core group" (i.e., code/libraries which are developed by the host application developer for the main functionality of the host application) and the "unrecognized group" (i.e., third party code that is not well-known, code with a malicious payload added, repackaged malicious code, etc.).

During the dynamic portion of the analysis, behaviors performed by the application are analyzed (e.g., to check whether the application uses its capabilities suspiciously/maliciously when executing). Heuristics can be used in conjunction with dynamic analysis to determine whether a particular behavior (e.g., when executed by a particular library) should be considered malicious. In various embodiments, static analysis results are used to customize dynamic analysis. For example, if static analysis reveals that user interactions are required to trigger a sensitive code segment, such interactions can be simulated during dynamic analysis.

A final verdict pertinent to the application can be made based on both the application's content (e.g., where the application includes a URL verified to be a malicious website) and on the context in which it behaves (e.g., whether the usage of a suspicious capability is made aware to an end user or is performed silently in the background). As mentioned above, the application can also be classified without a maliciousness verdict being made. For example, an embodiment of analysis system 300 can be configured to classify applications as using a particular SDK, containing a particular sensitive code segment, etc., without regard to whether or not the applications are in fact malicious.

As will be described in more detail below, information obtained (e.g., by embodiments of sample analysis system 300) during static/dynamic analysis can be used by other elements of cloud security service 122.

Example Process Performed by Sample Analysis System

Figure 4:
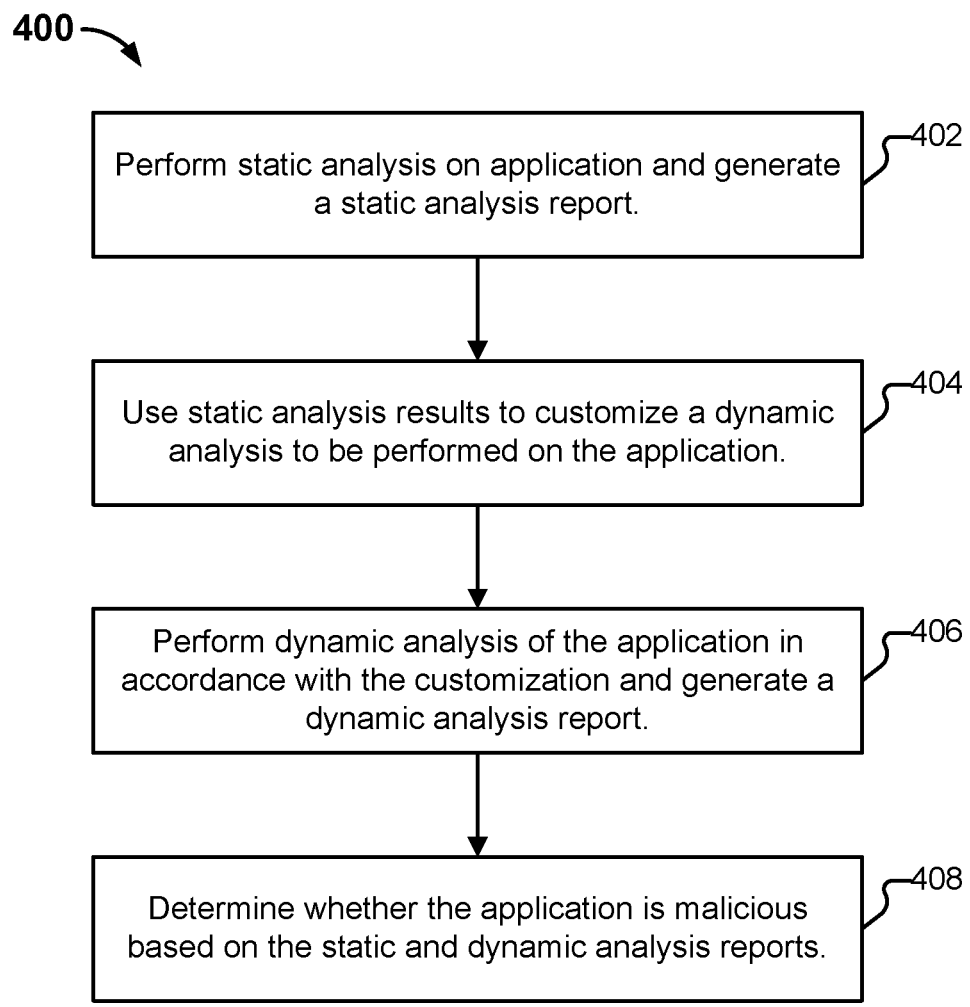
FIG. 4 illustrates an embodiment of a process for determining whether a sample application is malicious.

FIG. 4 illustrates an embodiment of a process for determining whether a sample is malicious. In various embodiments, process 400 is performed by sample analysis system 300. As will be described in more detail below, process 400 can be used in conjunction with other processes performed in the environment shown in FIG. 1 (or embodiments thereof). The process begins at 402 when static analysis is performed on a sample. As one example, static analysis is performed on "game.apk" by a static analysis engine 306 at 402. Suppose "game.apk" is malicious and will delete all of the SMSes in a user's Inbox if the device it is running on receives an SMS from ChinaMobile's service number (e.g., "10086"). The application does this to hide notifications pertaining to phone billing from the end user, so that the end user will not be alerted to atypical spending patterns (e.g., premium SMS purchases). During static analysis, a determination will be made that the game.apk application has access to SMS content. This capability of the application (along with other information, examples of which are provided above) is included in a static analysis report by the static analysis engine. At 404, the static analysis report is used to customize a dynamic analysis to be performed on the sample. As one example, since the application has access to SMS content, the dynamic analysis will be customized to include sending a variety of SMS messages. Other device resources to which the application does not have access (e.g., GPS location information) will not be simulated and thus can be excluded from the customized dynamic analysis plan. At 406, dynamic analysis of the application is performed using a dynamic analysis engine. One example of the dynamic analysis performed includes sending SMSes appearing to originate from a variety of sources, including 10086 (i.e., the service number of ChinaMobile) to the emulator. Sending such an SMS is an example of an "external event" (as is a simulated location change)—contrasted with an "internal event" (e.g., where button presses or file opens/closes are simulated). When game.apk deletes the SMS Inbox upon receiving the simulated incoming SMS from ChinaMobile, the game.apk's actions will be captured and logged. The dynamic analysis engine will examine the logged behavior in conjunction with creating a dynamic analysis report—and determine that the application has taken a malicious action with respect to SMS messages.

Finally, at 408 a determination is made as to whether the sample application is malicious, based on the static and dynamic analysis reports. In this example, coordinator 304 examines the static analysis report (concluding that the application is "suspicious") and dynamic analysis report (concluding the application is "malicious") and determines that game.apk is malicious. In some cases, static analysis engine 306 might conclude an application is malicious, while dynamic analysis engine 310 might conclude the application is merely suspicious. In various embodiments, the final decision rendered by analysis system 300 uses the more severe of the two assessments (e.g., concluding the application is malicious based on the static analysis report). In various embodiments, the final verdict is determined by coordinator 304 assigning points to each of the features triggered by the application (i.e., both the static features and the dynamic features). If the score exceeds a threshold, the application is determined to be malicious. More sophisticated scoring rubrics can also be used in conjunction with the techniques described herein, such as ones which weight dynamic analysis results more heavily than static analysis results.

In some embodiments, coordinator 304 (or another appropriate component) is configured to revise one or more heuristics based on process 400. As one example, static analysis engine 306 might determine that a given application is configured to send an SMS message, but static analysis engine 306 is unable to determine whether the SMS is in fact malicious (e.g., to a 900 number). One reason static analysis engine 306 might not know that the SMS is malicious is because the number is encoded in a way not previously seen by analysis system 300. Another reason static analysis engine 306 might not know the SMS is malicious is because the number is fetched from a URL included in the application (but not known to analysis system 300 to be a malicious URL). During dynamic analysis of the application, a determination might be made that the number to which the SMS is sent is in fact malicious (e.g., by comparing log information against a collection 314 of malicious/premium numbers). The static analysis rules can be revised to indicate that, in the future, if the encoded information representing the 900 number is encountered in any new applications, those applications are malicious (rather than suspicious). As another example, collection 314 can be refined to include the URL as known malicious. When a future application is evaluated by static analysis engine 306 that includes the URL, the static analysis engine will conclude that the application is malicious (instead of suspicious) based on the presence of the URL in collection 314.

Additional Detail Regarding Static/Dynamic Analysis

Ingestion

In various embodiments, when a new sample is received for analysis (e.g., an existing signature associated with the sample is not present in analysis system 300), it is added to processing queue 302. In the following example, suppose the sample is called "game.apk," (malware 130) but that it is not yet known (e.g., by cloud security service 122) whether or not the sample is malicious. The Android application package "game.apk" is an example of a "host APK."

As explained above, a sample for analysis can be received in a variety of ways. As one example, a sample can be received by data appliance 102 for analysis when data appliance 102 intercepts an email or other data transmission intended for client device 104 that includes the sample. Additional examples of the receipt of a sample include: (1) receipt by cloud security service 122 of the sample from data appliance 102, platform 152, or website 134 for analysis (e.g., via an API); and (2) crawling by cloud security service 122 of systems such as platform 152 or website 134.

Static Analysis

Coordinator 304 monitors the queue, and as resources (e.g., a static analysis worker) become available, coordinator 304 fetches a sample from queue 302 for processing (e.g., fetches game.apk). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information described below) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 140), instead of or in addition to a separate report 308 being created (i.e., portions of the database record form the report 308). Examples of collected information include: the package name, shared UID, APK file signer information, permissions claimed, and sensitive API calls included in the source (e.g., sending or erasing SMS messages, accessing the phonebook, and tracking user location changes). Function call graph and/or System Component Dependency Graph (SCDG) information can also be included. The static analysis engine also collects and stores information pertaining to the running context of the sample, such as: the minimum version of the Android OS required to run the application (the minimum SDK version), and the sensors it will have access to. The static analysis engine also evaluates various components of the sample and includes information pertaining to the evaluation in the report as well.

One example of how static analysis can be performed, using game.apk as an example, is as follows. Similar approaches can be used for other types of samples (e.g., iOS applications or Windows applications). First, static analysis engine 306 unzips game.apk and uses a reverser tool (or set of tools), such as dex2jar or Android Apktool, to reverse the resulting .dex file from Dalvik bytecode into Java bytecode. The output of the reversing operation is, in some embodiments, a set of .smali files—the direct output of the disassembly from Java virtual machine language, and other resource files included in the game.apk file.

An example representation of .smali information of a game made by a fictional company called ACME Games is shown in FIG. 5. Region 502 depicts various Google/Android libraries. Region 504 depicts a programming and configuration model for enterprise applications. Region 506 is a library that provides for advertisements, utilities, and statistics. Region 508 is a library that provides advertisements and statistics. Region 510 is a library that provides utilities, statistics, and application management. Regions 512 and 514 are libraries that provide advertisements and statistics. Region 516 is a library that provides utilities, statistics, and application management. Region 518 is where the actual game code is found. Region 520 depicts a programming and configuration model for enterprise applications. Region 522 is a library that provides utilities. Region 524 includes malicious code.

The static analysis engine retrieves (e.g., from database 140) a set of heuristic rules to be applied on the .smali code and resource files. In particular, static analysis engine 306 determines which rules are triggered (also referred to as "feature hits") by the source code. As one example, if the APK has duplicate entry names (e.g., containing two classes.dex files in the same folder within the APK), this indicates an attempt to exploit Android security vulnerability #8219321 (and an appropriate rule is triggered). Examples of other features (and a maliciousness indicator if hit) include the following (where an example of "the host APK" is "game.apk"):

1. "Contains APK file": If the received APK contains other APK files within the package, the host APK is suspicious.

2. "Contains Known Malicious APK File": If there exist other APK files within the package, those included APK files are analyzed separately (e.g., are added to the queue or checked with existing known malicious applications). If any of the included APK files are determined to be malicious, the received APK is considered malicious as well.

3. "Hide Menu Icons": The menu icons are graphical elements placed in the options menu. If the received APK does not have the menu icons or attempts to hide the menu icons, it is suspicious.

4. "File Type Mismatch": If the received APK contains files whose formats do not match their extensions, it is highly suspicious. For example, several Android malware families (e.g., Android.Droiddream family) attempt to hide additional included APK files as database files by naming them with the ".db" extension rather than ".apk." As another example, a file labeled as a ".png" may instead be an ".xml" file used for a command and control channel. However, a legitimate developer may also inadvertently misname a file (or otherwise misname a file without malicious intent).

5. "Contains Executable Files": If the received APK contains executables for the Linux platform (e.g., the .elf files), it is suspicious.

6. "Contains Malicious Executable Files": If the included executable files are known malicious files, e.g., known exploit libraries, the received APK is malicious.

7. "Installs Other APKs": If the received APK has the capacity of installing other APK files (e.g., while running in the background), it is suspicious.

8. "Uninstalls Other APKs": If the received APK has the capacity of uninstalling other APK files (e.g., while running in the background), it is suspicious.

9. "Contains Dangerous Shell Commands": If the received APK contains dangerous shell commands, e.g., chmod and su, it is malicious.

10. "Requires Abnormal Permissions": If the received APK requires permissions such as "system debug," or "authenticate accounts," and/or factory adjustments such as setting process limits, it is suspicious.

11. "Contains Phone number": If the received APK contains phone number(s), it is suspicious (e.g., because the application may place calls or text messages to premium numbers).

12. "Contains URLs": If the received APK contains URL(s) within the source code, it is suspicious.

13. "Contains Malicious URL": Any URL(s) found are compared against a list of known malicious sites. If the URL(s) link to malicious site(s), the received APK is malicious.

14. "Contains Autorun.inf File": If the received APK contains an autorun.inf file that is for the Windows platform, it is malicious (e.g., because an attempt will be made by the user's computer to execute the file if the user connects the phone to the computer).

15. "Duplicate Entries": If the APK has duplicate entry names (e.g., containing two classes.dex files in the same folder within the APK) in the file, it is malicious. (E.g., because it is attempting to exploit the Android security vulnerability #8219321.)

In various embodiments, static analysis engine 306 takes into account the group to which a library responsible for a feature hit belongs when determining whether a feature hit indicates malice. One example is where a library in the common group includes code for certain "suspicious" activities (e.g., hiding or attempting to hide menu icons, calling/containing additional executable files, or including a phone number) that could be resolved by the static analysis engine as not suspicious. In some embodiments, at least some feature hits will be treated as malicious, irrespective of which classification of library (e.g., core, common, or unrecognized) includes the code. One example is: "contains malicious URL."

The static analysis engine stores the results of the rule testing in a database (e.g., in database 140) in a record associated with the sample being tested (and/or includes the results in report 308 as applicable). In some embodiments, the static analysis engine also forms a verdict with respect to the application (e.g., "safe," "suspicious," or "malicious"). As one example, the verdict can be "malicious" if even one "malicious" static feature is present in the application. As another example, if the only "suspicious" code is attributable to a common library included in the application, and no "malicious" code is found, the verdict can be "safe." As yet another example, points can be assigned to each of the features (e.g., based on severity if found; based on how reliable the feature is for predicting malice; etc.) and a verdict can be assigned by static analysis engine 306 (or the coordinator, if applicable) based on the number of points associated with the static analysis results. In this example, points can be assigned differently based on library groupings. For example, a "suspicious" hit from code in the unrecognized group can be assigned a higher score than a "suspicious" hit from code in the common group. As yet another example, the verdict can be "original" or "repackaged" (e.g., where static analysis engine 306 is configured to analyze applications for repackaging, only, without additional regard for maliciousness).

In some cases, a sample may appear "suspicious" to static analysis engine 306 due to poor programming choices made by a harmless programmer, rather than a malicious one. As one example, the programmer may have named an executable that handles playing of an MP3 file with a ".mp3" extension. This sort of filetype mismatch (i.e., that an executable is incorrectly labeled with a non-executable extension) could indicate malicious behavior (i.e., a malicious individual is trying to hide a malicious executable through misnaming the filename). Here, however, the file was inadvertently mislabeled. Static analysis engine 306 notes (e.g., with rule "File Type Mismatch" being included in the static analysis report) that there is a "suspicious" aspect to the file which warrants additional investigation during dynamic analysis to reach a conclusion as to whether the application is benign or malicious.

In various embodiments, static analysis engine 306 determines whether a sample will crash (and/or cause a virtual machine to crash) if executed (e.g., during a dynamic analysis phase). As one example, static analysis engine 306 can perform integrity checking and determine that a file is missing, corrupted, unsigned, etc. In this scenario, dynamic analysis can be skipped (e.g., with static analysis noting in report 308 that the application will crash if an attempt is made to install/execute it).

Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a device emulator (e.g., running in a virtual machine). Results of the static analysis (e.g., performed by static analysis engine 306), whether in report form (308) and/or as stored in database 140, or otherwise stored are provided as input to dynamic analysis engine 310. The static report information is used to help customize the type of dynamic analysis performed by dynamic analysis engine 310, conserving resources and/or shortening the time required to evaluate an application. As one example, if static analysis has concluded that the sample does not have the ability to access SMS messages, during dynamic analysis, the receipt of SMS messages will not be simulated in some embodiments. As another example, if static analysis has concluded that the only access the sample has to a sensitive permission (e.g., the ability to read SMS messages) is via a common library, certain triggering actions (e.g., the receipt of SMS messages) can similarly not be simulated. As another example, if static analysis has concluded that the application has the ability to access GPS information, during dynamic analysis, various changes in location of the device can be simulated. However, if the application lacks the ability to access GPS information, in some embodiments no location changes will be simulated (reducing the amount of time/computing resources needed to complete dynamic analysis). Similarly, even where the application has the ability to access GPS information, if that information is only accessed via a common library, in some embodiments no location changes will be simulated.

Dynamic analysis engine 310 can determine which emulator(s) to run based on the minimum operating system version number required by the sample (and determined during static analysis). If the minimum version number is Android 4.0, dynamic analysis engine 310 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 4.0). Where multiple emulators are used, a single dynamic analysis engine can manage all of the emulators (whether in sequence or in parallel), or multiple dynamic analysis engines can be used (e.g., with each managing its own emulator), as applicable.

The dynamic analysis engine/worker begins analysis by preparing and setting up the running environment for the application to be tested. Examples of operations carried out by the dynamic analysis engine/worker at this point include: (1) determining which system services should be started (e.g., simulated motion sensor readings and simulated location changes); and (2) determining a set of simulated user operations that should take place. As previously mentioned, results of static analysis can be used to inform what dynamic analysis is performed. For example, if static analysis determines that a user interaction is included in an execution path to a sensitive code segment, dynamic analysis engine 310 can be set up to simulate such a user interaction. In particular, verdict/path pairs determined by static analysis engine 306 can be used to determine which system events and/or UI events should be simulated during dynamic analysis.

The dynamic analysis engine/worker loads an appropriate emulator (e.g., Android version 2.3) and installs the application to be analyzed. The application is executed and various applicable actions (e.g., selected based on static analysis report 308) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator.

The environment used by analysis system 300 is instrumented/hooked such that behaviors observed while the application is executing are logged as they occur, and which libraries/classes are responsible for which behaviors is tracked (e.g., using a customized kernel that supports hooking and logcat). In some embodiments, the log data is stored as a temporary file on analysis system 300. Further, network traffic associated with the emulator is captured (e.g., using pcap). Such log data indicates information such as which class or other subcomponent within the sample was responsible for the sample engaging in a particular behavior. For example, when the sample attempts to send an SMS, or access a device identifier, the path to the sensitive code segment corresponding to that behavior is logged and can be used in further analysis.

The dynamic analysis engine can be provided with group identity information as a result of the earlier performed static analysis. Thus for example, a read of a device identifier performed by a library included in the common group is differentiable from a read of a device identifier performed by a library included in the uncommon group (whether core group or unrecognized group). When the device identifier read is performed by a library in the common group (e.g., performed by a well-known advertising library), that behavior can be considered not suspicious (i.e., is an expected behavior). In contrast, when the device identifier is read by a library in the uncommon group (whether core or unrecognized) that behavior is potentially malicious. As another example, an access of device contacts is permissible by a common group library. It may also be permissible where the main purpose of the application (i.e., functionality included in core group libraries and explicitly stated in the description of the application (e.g., appearing in the manifest or on platform 152)) is to be a contact manager. In contrast, where the read is performed by a library included in the unrecognized group, the behavior is highly suspicious.

In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 310 evaluates both log files, along with any network traffic captured during the two stages (e.g., using pcap).

Examples of features that can be detected during dynamic analysis (and a maliciousness indicator if hit) include the following (where an example of "the host APK" is again "game.apk"):

1. "Connects To Unknown Websites": If the received APK attempts to connect to an unknown website (e.g., one that is not on a whitelist of known safe websites), it is suspicious.

2. "Connects To Malicious Websites": If the received APK attempts to connect to a known malicious website, it is malicious.

3. "Adds Malicious Bookmarks": If the received APK attempts to add a known malicious website to the bookmarks of a browser, it is malicious.

4. "Installs Other APKs": If the received APK attempts to install other APK files, it is malicious. The APK to be installed can either be included within the original (received) APK file, or downloaded by the received APK from a remote server.

5. "Uninstalls Other APK": If the received APK attempts to uninstall other installed apps, it is malicious.

6. "Uninstalls Itself": If the received APK attempts to uninstall itself after installation, it is malicious.

7. "Sends SMS In Background": If the received APK attempts to send SMS messages while running in the background, it is malicious.

8. "Inserts SMS To Inbox": If the received APK attempts to insert an SMS message into the Inbox (e.g., while running in the background), it is malicious.

9. "Deletes SMS From Inbox": If the received APK attempts to delete one or more SMS messages present in the Inbox, it is malicious.

10. "Sends SMS To Contacts": If the received APK attempts to send multiple contacts automatically, it is malicious.

11. "Auto Replies To SMS": If the received APK attempts to send an SMS upon receiving an SMS, it is malicious.

12. "Adds APN Settings": If the received APK attempts to insert new APN settings, it is suspicious.

13. "Calls Sensitive Service": If the received APK attempts to call sensitive system services or execute dangerous shell commands (e.g., the "mount" command), it is malicious.

14. "Loads Malicious File": If the received APK loads one or more files when running, the loaded files will be checked separately. If the loaded files are malicious, then the received APK is malicious.

15. "Creates APK Files": If the received APK attempts to save other APK files in one of the system folders (e.g., "/system/app" or "/data/app"), it is suspicious. The saved APK files will be checked separately.

16. "Creates Malicious Files": If the received APK attempts to create a file with a sensitive file type, such as .elf or autorun.inf, it is malicious.

17. "Accesses Hidden Folders Or Files": If the received APK attempts to create or access hidden folders or files on the local storage and outside its own local storage folder, it is malicious. An example of a hidden folder is "./.hidden/."

18. "Changes File Permissions": If the received APK attempts to change the default permissions of local files to "executable," and this file has not been checked in static analysis, or has been determined to be malicious in static analysis, it is malicious.

As with the static analysis engine, the dynamic analysis engine stores the results of its analysis in the database in the record associated with the application being tested (and/or includes the results in report 312 as applicable). As will be described in more detail below, a variety of conclusions (also referred to herein as final verdicts) can be made with respect to analyzed applications. In some embodiments, a final verdict associated with the sample is made (e.g., based on a combination of report 308 and report 312) by coordinator 304. Additional detail regarding various examples of conclusions that can be made based on techniques described herein will now be provided.

Example Verdicts

A variety of approaches can be used to determine whether an application is malicious. As one example, the verdict can be "malicious" if even one "malicious" dynamic feature is present in the application. As another example, points can be assigned to each of the features (e.g., based on severity if found; based on how reliable the feature is for predicting malice; etc.) and a verdict can be assigned by dynamic analysis engine 310 (or the coordinator, if applicable) based on the number of points associated with the static analysis results. Considerations such as to which group a library responsible for a suspicious action belongs can be taken into account in determining a maliciousness verdict. For example, when a host APK requires permissions to access a GPS, it may be the case that access is required by the developer (i.e., code in the core or unrecognized groups) or by well-known common libraries (i.e., code in the common group). A request for this sensitive privilege by code included in the core or unrecognized groups can be treated as more suspicious (whether in static analysis, dynamic analysis, or both) than a request made by code included in the common library. As another example, when a library is encountered with the same library name as a common library, but different code from that common library, the scenario is highly suspicious (i.e., that the library was injected with malicious code). As mentioned above, one way of tracking this information is by maintaining lists (316) of certificates or other verifications of canonical forms of common libraries and comparing purported common libraries (e.g., during static analysis) against the verified versions.

Different weights can be applied to feature hits by different libraries/groups. For example, the feature of "uploading a device ID to a remote website" when performed by a library included in the common group can be assigned a low weight (or score of zero, as applicable), since the library was authored by a renowned developer (who is, e.g., likely to be responsible for its code). However, the same feature hit performed by a library included in the unrecognized group can be assigned a much higher weight (e.g., contributing to a much higher maliciousness score). The use of different weights based on the library's grouping lowers the false positive rate and improves the detection rate.

In some embodiments, behavior taken by code in the core group is treated with less suspicion than when the same behavior is taken by code in the unrecognized group. Here, by virtue of being executed by code in the core group, the behavior is highly related to the application's main purpose. And, a user of the application is highly likely to be aware of the sensitive operations (if any) performed by code in the core group. In some embodiments, information such as the application's description on platform 152, its description in a manifest file, etc., are considered in evaluating the suspiciousness of an action. As one example, if the application is found (e.g., in dynamic analysis) to be "attempting to check if the phone is rooted," and the description of this application on platform 152 includes phrases such as "may need rooted device," then the attempts to determine whether the device is rooted would not be considered as suspicious behavior. As another example, as explained above, if the application purports to be a contact manager, and is described as being a contact manager on platform 152, then attempts by the application to access contacts (i.e., performed by core group libraries) are less suspicious than where the application is described as being a flashlight and the attempts to access contacts are performed by unrecognized group libraries.

Automated Malware Family Signature Generation

Techniques discussed above have generally been described in the context of analyzing an individual file (e.g., malware 130), and enforcing a policy with respect to that file (e.g., blocking or allowing it). In many cases, individual pieces of malware are closely related to one another (e.g., comprising a malware family). As will be described in more detail below, cloud security service 122 is configured to cluster malicious samples into groups. Characteristics shared by group members are analyzed to determine which characteristics are good identifiers for group membership (e.g., are the most likely to minimize false positives and false negatives if deployed). Selected characteristics are then used to construct family signatures, which can be used to help locate additional related samples (e.g., new members of a malware family/variants of such a family).

Portions of information (e.g., obtained via static analysis) for two Android samples (sample 602 and sample 604) are shown in FIG. 6. Sample 602 and sample 604 share a variety of characteristics (and will ultimately be determined to belong to the same family, as a result of embodiments of process 700 being performed on them). Examples of characteristics that are common (or very similar) are shown in regions 606/608, 610/612, 614/616, and 618/620, respectively.

Being able to identify commonalties between pieces of malware (and thus, e.g., identify whether a new sample shares commonality with known malware) can be beneficial. As one example, suppose an attacker creates a piece of polymorphic ransomware and sends a first copy to enterprise network 110 and a second copy to enterprise network 114. The two samples are very similar (e.g., causing the same harm—encrypting files and demanding payment for unlocking services) but have different MD5 hash values (and/or other cryptographic hash values, such as SHA-256 hash values). Further suppose that data appliances 102 and 136 both provide copies of their respective samples to cloud security service 122 for analysis. Using techniques described herein, cloud security service 122 is able to determine that the two samples are members of the same malware family, and to generate a high quality family signature (with a very low false positive rate) that can be used to identify other samples belonging to the same family. The signature can be provided to other elements depicted in FIG. 1. As one example, the signature can be provided to data appliance 148. If the attacker subsequently attempts to send a variant of the ransomware to network 116, its transmission can be automatically blocked by data appliance 148 accordingly (and/or other remedial actions can be taken, as applicable). As a second example, the signature can be provided to a threat intelligence platform (e.g., threat intelligence service 170). The threat intelligence platform can use the information (e.g., that a sample belonging to a particularly dangerous malware family such as a ransomware family has been seen within a network (e.g., network 148)) to help prioritize responding to threats (e.g., over less harmful samples).

Figure 7:
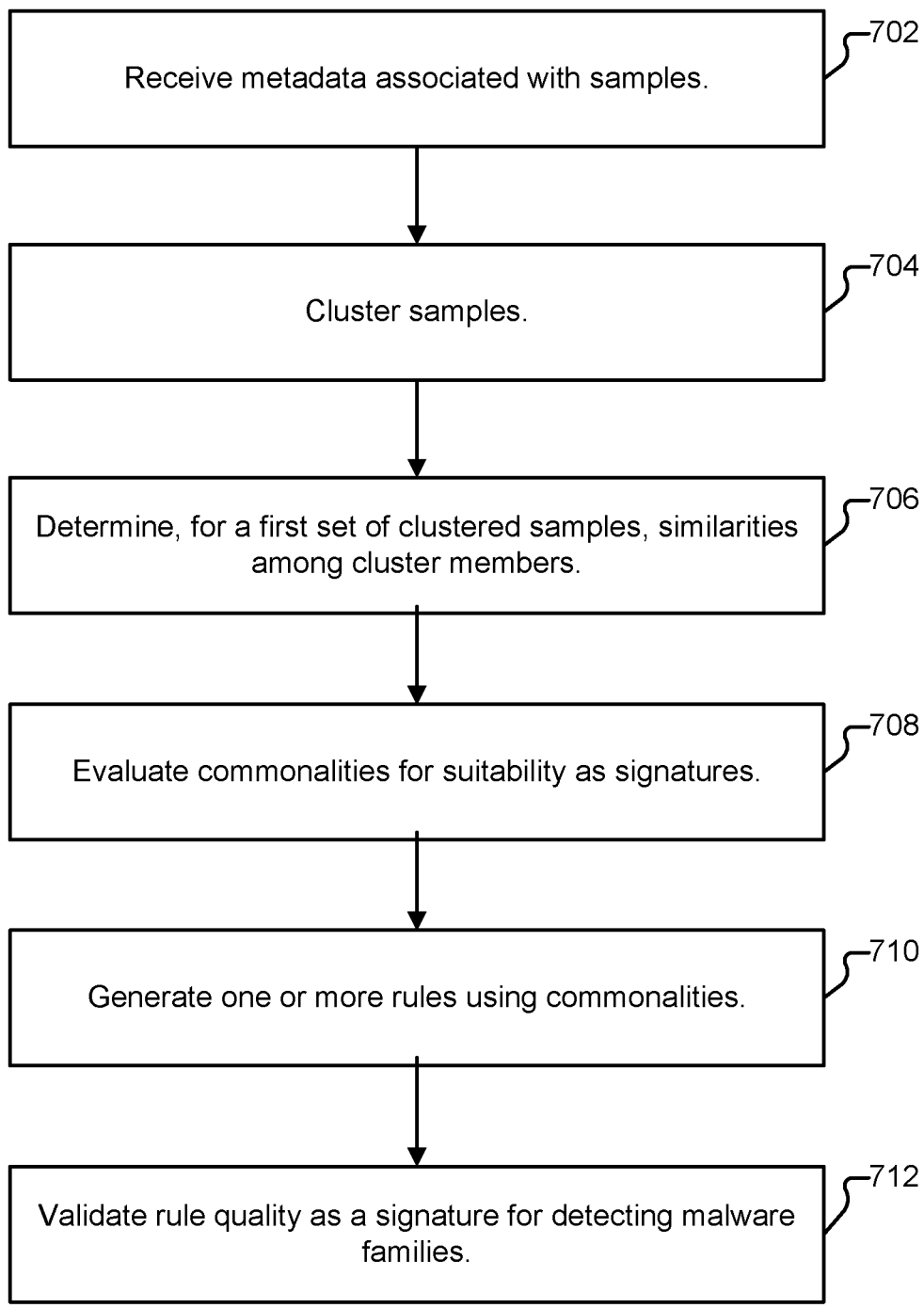
FIG. 7 illustrates an example of a process for generating malware family signatures.

FIG. 7 illustrates an example of a process for generating malware family signatures. In various embodiments, process 700 is performed by cloud security service 122. Returning to FIG. 1, as previously explained, database 140 stores a variety of information associated with samples. Examples of such information include static/dynamic analysis reports (e.g., provided by sample analysis system 300), as well as information provided by other sources, such as data provided by platform 152 (e.g., including app descriptions, reviews, categorization information, etc.) and scanner service 172 (e.g., verdict information) as applicable. Such information stored by database 140 about a particular sample (whether it was obtained through static analysis, dynamic analysis, provided by a third party, etc.) is referred to hereinafter, collectively, as the sample's metadata.

Process 700 begins at 702 when metadata associated with samples is received. As one example of processing performed at 702, metadata processor 154 accesses information stored in database 140 and retrieves metadata associated with the samples. In various embodiments, metadata processor 154 comprises a set of scripts (e.g., written in an appropriate scripting language) and a search engine (e.g., Apache Lucene, ElasticSearch, etc.).

In the following discussion, suppose that database 140 includes information about approximately four million samples, of which one million are confirmed to be malicious (and the remainder comprise known good samples, samples with mixed verdicts (e.g., "suspicious"), and samples lacking verdicts). At 702, metadata for the four million samples is retrieved by metadata processor 154. In various embodiments, the metadata is provided as a set of one or more XML files. Using an Android APK sample as an example, an XML file for the sample is received at 702 that includes basic properties of the sample (e.g., package name, activity names, service names, receiver names, certificate issuers, certificate owners, and file path(s)), as well as more advanced analysis results (e.g., behavior hits). Other types of samples (e.g., Windows PE files) will have similar kinds of metadata provided at 702. The received metadata is inserted, in various embodiments, by metadata processor 154 (or another appropriate module) in an ElasticSearch index 160 (forming a corpus of sample metadata where the "pages" are the XML files).

Metadata processor 154 processes the metadata received at 702 to determine sets of fields and values for each of the four million samples, removing from consideration metadata that could negatively affect upcoming similarity measurements. An example of a portion of metadata for an Android sample (that happens to be benign) is shown in FIG. 8. The metadata shown represents an excerpt from a static analysis report for the sample. An example of a field is "package" (802) and an example of a value is "org.sergez.splayer" (804). Metadata processor 154 tokenizes the fields and values for each sample into tokens in accordance with a set of tokenization rules (158), to extract the meaningful portions of metadata. As one example, while some fields have individual values, other fields have multiple values. During tokenization, metadata processor 154 creates a token (i.e., a name:value pair) for each value. Thus, if a given sample has a field of "android_manifest.activity.name" and two corresponding values: "com.socialmobileflashlight.Flashlight" and "com.admob.android.ads.AdMobActivity," during tokenization, metadata processor 154 will create a first token of "android_manifest.activity.name": "com.socialmobile-.flashlight.Flashlight" and a second token of "android_manifest.activity.name": "com.admob.android.ads.AdMobActivity." As another example of a tokenization rule, for some fields (e.g., those involving the compiled resources in resources.arsc), tokenization is performed using various truncations of the corresponding value (e.g., the values appearing in between each slash or semicolon). For other fields (e.g., service.name), the entire string is used as a single token value. Another example of processing that can be performed during tokenization is the removal of stop words (e.g., "the" and "Android," which can be provided to metadata processor 154 as a list, learned by metadata processor 154 through text analysis, etc., as applicable).

In some embodiments, metadata processor 154 determines weights for each of the tokens by performing term frequency-inverse document frequency (TF-IDF) analysis. As one example, metadata processor 154 can use the set of tokens as input to an ElasticSearch TF-IDF operation, which will return a ranked list of tokens (sorted by the weight). The value indicates, for each token, a weight of the token's ability to identify a sample.

Tokens and their weights can be used by metadata processor 154 to construct a sparse vector list 162 (stored using an appropriate approach, such as Hadoop Distributed File System (HDFS)). Each row in the sparse vector list corresponds to a sample and indicates those tokens for which the sample had a non-zero value (i.e., which features were hit by the sample, and the corresponding weights of those features). An example row of sparse vector list 162 is depicted in FIG. 9A (wrapped due to space constraints within the figure). As indicated in region 902, a total of 582,275 tokens were determined for the corpus (of the metadata corresponding to four million samples). A SHA-256 hash value for the particular line's sample is shown in region 904. Other hash values can also be used to identify the sample, as applicable (e.g., an MD5 hash value). Each of the tokens hit by the sample, and corresponding weights, are also included. One example is that the sample hits token 14262 (906) with a weight of 9.6758795 (908). As indicated in FIG. 9A, an arbitrary sample may typically have tens of token hits (out of roughly 600 thousand tokens in this example). Other samples will have more, or fewer, token hits.

Returning to process 700, at 704, the samples (e.g., the four million malware samples) are clustered. As one example of the processing performed at 704, metadata processor 154 provides clustering system 156 with sparse vector list 162 (e.g., by referencing its location in the HDFS), as well as instructions such as what type of clustering approach to use and what threshold/cut-off values to use, etc. Various combinations of industry standard deep/machine learning technologies such as TensorFlow, and scripts (e.g., written in a suitable scripting language) can be used to implement clustering system 156 and coordinate it working in cooperation with various other elements of cloud security service 122, such as metadata processor 154. Further, as previously explained, components of cloud security service 122, of which clustering system 156 is an example, can be implemented using a scalable/elastic architecture (e.g., Apache Spark Cluster).

Suppose that metadata processor 154 instructs clustering system 156 to use a k-means-based clustering approach to cluster the four million samples (as represented in sparse vector list 162), using a maximum of 2,000 centers. In some embodiments, clustering system 156 uses traditional k-means for performing its clustering. Example results (described in more detail below, e.g., in conjunction with FIG. 9B) can be obtained by clustering system 156 performing traditional k-means clustering. As one example, clustering system 156 can perform traditional k-means clustering where the clustering iterates until 99% of samples remain with a given center (i.e., only 1% of samples change their center). A cutoff can be used, as applicable (e.g., maximum rounds=75), if convergence isn't reached before the cutoff.

Another approach is for metadata processor 154 to instruct clustering system 156 to perform multiple runs of k-means (e.g., in parallel), in which multiple runs of clustering are performed and only those clusters whose membership is consistent across each run are used as output. As one example, suppose ten runs of k-means clustering are performed using sparse vector list 162 by clustering system 156 (all with an upper limit of 2,000 centers). Suppose the first run resulted in 1700 centers, the second run resulted in 1900 centers, the third run resulted in 1950 centers, etc. . . . In some embodiments, only those clusters with member samples that were consistent across all ten runs are used as output.

Excerpted sample output from clustering system 156 is depicted in FIG. 9B. In the example of FIG. 9B, a total of 2,000 centers (indexed as centers 0 to 1999) were found. The first cluster (having an index of "0") includes samples 952, 954, and 956. Samples 958 and 960 are included in a cluster having an index of "360". The centers having indices 361 and 362 are missing from the output shown in FIG. 9B. This is because those centers do not have any samples clustered around them (i.e., all samples are closer to a center other than either the center having index 361 or index 362 and are accordingly associated with those other centers). In various embodiments, the output of the clustering performed by clustering system 156 at 704 (a representation of a portion of which is shown in FIG. 9B) is also stored in HDFS, and clustering system 156 notifies metadata processor 154 that its clustering has completed.

At 706, similarities among members of the various clusters are determined. One example of the processing performed at 706 is as follows. For each cluster, similarity exactor 164 (which can be implemented using a set of scripts) obtains metadata for each of the members of the cluster. As one example, for the first cluster shown in FIG. 9B (index 0), similarity extractor 164 obtains metadata (e.g., via ElasticSearch) for each of samples 952-956 (and any other samples in the cluster). Similarity extractor 164 examines the metadata of each of the cluster members, looking for commonalties.

Metadata for two Android samples (sample 1002 and sample 1004) is shown in FIG. 10. Suppose samples 1002 and 1004 are included (along with other samples) in a cluster (i.e., based on processing performed at 704). At 706, similarity extractor 164 examines the metadata of samples 1002 and 1004 and determines that samples 1002 and 1004 have (respectively) metadata 1006/1008 (a service name), and 1010/1012 (a receiver name) in common. Similarity extractor 164 provides as output, the common metadata (e.g., metadata 1006-1012), also referred to herein as a "similarity," for each cluster.

One way to represent a similarity is as a combination of a field, a value, and a type. Using metadata 1006 as an example, the field is "android_manifest.service.name" and the value is "com.passionteam.lightdd.CoreService" (in this example, a string). The type indicates what portion of the metadata is shared across the cluster member samples. Examples of types include match (100% of the value is shared), postfix (a tail portion of the metadata is shared), and prefix (a head portion of the metadata is shared). Examples of each type are shown in FIG. 11 at 1102, 1104, and 1106, respectively. Returning to FIG. 6, portions 618 and 620 are examples of where a "postfix" type match would apply. For example, in sample 602, the last characters of the string "org.b4d40ad47bf8a7c91a86e.BootHandler" are shared by the last characters of the string "com.astral.core.OnBootHandler" in sample 604. A prefix match would similarly be one where the first portion of characters of the string matched across samples (but the last portion did not).

In some cases, the similarities extracted by similarity extractor 164 may be common to many samples (including many samples outside of the cluster being processed by similarity extractor 164). As one example, many samples may share the same advertising library, or graphics library (and will therefore have in common metadata associated with that advertising library/graphics library). Other similarities extracted by similarity extractor 164 may be unique (or virtually unique) to members of the cluster (e.g., having a digital certificate signed by a specific entity). Such similarities can be helpful in distinguishing samples in a particular malware family from other samples.

At 708, the similarities determined at 706 are evaluated for quality (e.g., how well a given similarity can uniquely identify cluster members). As one example of processing that can be performed at 708, the output of similarity extractor 164 is provided to similarity measurer 166 (also implemented, in various embodiments, as a set of scripts written in an appropriate scripting language). For each similarity (e.g., a "match" of the service name and value shown in region 1006 across all cluster members (see, e.g., region 1008)), similarity measurer 166 queries the corpus of samples (e.g., containing information on four million samples, some of which are malicious, some of which are benign, etc.), and determines how many of the samples in the corpus share the similarity.

Suppose the cluster from which metadata 1006 was extracted as a similarity includes 3,000 members and that when the corpus is queried, 10,000 results are returned (i.e., 10,000 samples include metadata 1006). This can indicate that using metadata 1006 as part of a signature for a malware family could be problematic as it is over inclusive. Suppose now that exactly 3,000 results are returned. This indicates that the presence of metadata 1006 uniquely identifies the 3,000 cluster members out of the corpus of four million samples. Now suppose that 3,100 results are returned. One reason for a close but not exact number of matches is that, during clustering, a few (e.g., 100) samples wind up in clusters other than the cluster of 3,000, or otherwise failed to cluster with the 3,000 samples. Such samples are likely to be very similar to the 3,000 cluster members, and it can be desirable to treat them as belonging with the cluster members. Accordingly, in some embodiments, a threshold is used by similarity measurer 166 when determining whether particular metadata is likely to be suitable as an identifier for the cluster members. One example of a threshold is that the results (i.e., from searching the corpus) should include no more than 10% additional samples (than are included in the cluster). The similarity quality can be expressed as a score:

$$\text{quality(similarity)} = \frac{\text{number of cluster members}}{\text{number of corpus hits}}.$$

For a given cluster, those similarities having the highest quality score (e.g., greater than or equal to 0.9) are provided as a set to similarity transformer 168.

At 710, similarity transformer 168 transforms, for a given cluster, its similarities (e.g., expressed using a combination of a type, a field, and a value) having the highest quality (e.g., as determined by similarity measurer 166) into rules, as applicable. In particular, the field/value pairs are transformed into a set of conditions which can be used in a query against a variety of repositories, such as a cultivated set of malware samples stored in storage 142 (or another appropriate location in cloud security service 122), and third party services (e.g., scanner service 172).

FIG. 11 illustrates a set of similarities shared by the samples of an example cluster. Each sample member in the cluster includes metadata items that are an exact match to each of the items shown in region 1102, each sample member in the cluster includes metadata items that end with each of the items shown in region 1104, and each member in the cluster includes metadata items that begin with each of the items shown in region 1106. Turning to a specific similarity, data such as is shown in region 1108 represents a similarity where an exact match of "com.passionteam.lightdd.Receiver" in the field "android_manifest.receiver.name" is required to be matched by a given sample in the cluster. As one example of the processing that can be performed at 710, the similarity can be transformed as follows:

"operator": "is",
"field": "android_manifest.receiver.name",
"value": "com.passionteam.lightdd.Receiver".

For "postfix" and "prefix" types, other operators can be used (e.g., "ends with" and "starts with"). Further, the similarity can instead/also be transformed at 710, as needed, into the formats/syntaxes used for querying third party repositories, such as scanning service 172. The set of transformed similarities for a given cluster can be combined into a rule, which can be used to query threat intelligence service 170 or other appropriate sources.

As described above, in various embodiments, metadata processor 154 performs processing using a corpus of (for example) four million samples that include malicious samples, benign samples, suspicious samples, etc. In some cases, the clusters determined at 704 of process 700 will include samples that are both malicious and benign. And, it can sometimes be the case, accordingly, that the similarities determined at 706 (and selected at 708 as being high quality) will cover both malicious and benign samples. In various embodiments, additional processing is performed (e.g., at 712), to determine the ability of each of the rules generated at 710 to detect malware families (e.g., does not cover more than a threshold amount of benign samples, etc.).

One example of processing that can be performed at 712 is as follows. For each rule generated at 710, validator 174 (which can be implemented using a set of scripts, written in an appropriate scripting language) queries threat intelligence service 170 using the rule. For each sample returned as a result, validator 174 determines whether the sample is malicious (e.g., has an associated verdict of "malicious"). If a threshold amount of malicious results is returned (or, another appropriate measure), the similarities from which the rule is composed can be confirmed as useful in identifying a malware family (i.e., can be used to generate signatures for identifying malware family members). One example is a threshold requirement that at least 90% of the sample hits for the rule have an associated malicious verdict. Another example is a requirement that (while samples having no verdict can be included in the results) no benign results can be included in the results.

In some embodiments, threat intelligence service 170 is configured to use database 140 (and its information on four million samples in the examples described herein). In some embodiments, threat intelligence service 170 is configured to use other data sources (in addition to, or instead of database 140). As one example, suppose database 140 includes information on only the last three years' worth of samples processed by sample analysis system 300. In some embodiments, threat intelligence service 170 is configured to also use a database of historical sample information (e.g., including samples that are older than three years, and/or about which information was collected by sources other than sample analysis system 300).

Further, in various embodiments, validator 174 (or, as applicable, threat intelligence service 170) queries external services. As one example, validator 174 can query scanner service 172 (which includes malware analysis engines provided by a variety of third party vendors), using each of the samples returned by threat intelligence service 170. So long as a threshold number of samples matching the rule (e.g., 90%) are confirmed to have predominantly malicious verdicts in scanner service 172 (e.g., a threshold number of engines that examined a given sample determined it to be malicious), validator 174 can confirm the ability of the components of the rule to detect a malware family. Additional information can also be collected from scanner service 172 for use by validator 174 in deciding whether the similarities for a given cluster are robust enough to be used to generate a malware family signature. For example, where a threshold number of engines in use by scanner service 172 have provided a malware family designation to results, this can be used by scanner service 172 as an additional signal of the quality of the similarities in identifying a given malware family.

Results of performing process 700 can be used in a variety of ways. The following are some examples:

1. Malware Detection Signature Generation and Detection: A signature for a malware family can be constructed using similarities validated in accordance with techniques described above. For example, once a determination is made (e.g., at 712) that the set of similarities selected at 706 predominantly (or only, as applicable) return malware samples as results, the similarities can be used as a signature and provided to sample analysis system 300; data appliances 102, 136, and 148; etc. The signature (or other applicable representation of the set of constituent similarities) can also be used to search repositories such as database 140 periodically to return a list of all samples matching the signature.

2. Malware Family Naming: A malware family can be automatically named using textual strings included in the family's similarities. Another approach to automatic name generation is for validator 174 to assemble all of the tags associated with all of the cluster member samples in scanner service 172 and select as a family name the most common tag.

3. Additional Insight: Having a set of high quality similarities for a given malware family can provide additional insight when attempting to learn more about malware and how it propagates. As a first example, suppose two malware families share a threshold number of similarities (e.g., 70%). This can indicate that the two families are related. Such information can be surfaced (e.g., to a researcher) for further investigation (e.g., by threat intelligence service 170 periodically running queries against the similarities of various families). As a second example, suppose an IP address or domain name is included in a similarity. Malware authors often use the same or similar command and control resources across their malware. Such a resource can be surfaced (e.g., by threat intelligence service 170) as a potential command and control domain for further investigation. And, as the IP address/domain name is relatively unique to the family (e.g., based on the TF-IDF analysis described above), false positives will be low. As a third example, in some cases, the samples in a group may vary greatly (e.g., the similarities captured may be due to esoteric SDKs or libraries). In such a scenario, an investigation can be performed (e.g., of the libraries) and the libraries/SDKs given verdicts (e.g., a benign verdict) which can prevent (as applicable) future false positives by sample analysis system 300.

Results of the processing described herein can also be useful in examining clusters of samples not ultimately determined to be malicious. As an example, where metadata is common to virtually all members of a cluster, but missing from one member (or a handful of members), this can indicate that the outlier cluster member is a fake/repackaged version of a legitimate application. One example of this is where all of the samples in a cluster have the same signing certificate, except for one sample. The sample with the different signing certificate is potentially malicious (even if the other samples are not). Information about the suspect sample can be surfaced (e.g., similarity extractor 164 can flag the sample for additional analysis (e.g., to be performed by sample analysis system 300)).

Process 700 (or portions thereof) can be performed iteratively. For example, suppose that when process 700 is initially run, four million samples are clustered at 704. After a first iteration of portions 706-712 of process 700 is performed, suppose that malware family signatures collectively covering 200 k of the million samples are generated. There may well be additional samples with affinities for one another that were not detected during the first iteration (e.g., due to limitations such as on the number of centers). New clusters of malware may emerge with those 200 k samples removed. Accordingly, in various embodiments, portions 704-712 of process 700 are repeated, using a reduced set of malware (i.e., with those 200 k samples removed), and additional signatures ultimately found (e.g., at a second iteration of portion 712 of process 700). In various embodiments, iterations over portions 704-712 of process 700 (or subsets thereof) continue until a low quality threshold mark is reached (e.g., where no commonalties are selected as suitable at 708, or where no rules are validated at 712).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
   a processor configured to:
   receive a set of metadata associated with a plurality of samples;
   cluster the samples;
   determine, for members of a first cluster, a set of similarities shared among at least a portion of the members of the first cluster;
   evaluate the similarities for suitability as a malware family signature, wherein suitability is evaluated based at least in part on how well the similarities uniquely identify the members of the first cluster; and generate the malware family signature, including by generating one or more rules using at least a portion of the set of similarities and validating rule quality; and a memory coupled to the processor and configured to provide the processor with instructions.

2. The system of claim 1 wherein the processor is further configured to determine, for a first sample included in the plurality of samples, a set of features comprising name-value pairs.

3. The system of claim 2 wherein determining the set of features includes performing a tokenization.

4. The system of claim 1 wherein the processor is further configured to assign weights to a set of tokens.

5. The system of claim 4 wherein the weights are assigned using term frequency-inverse document frequency analysis.

6. The system of claim 1 wherein the processor is further configured to generate a vector list that indicates, for a given sample, a set of tokens hit by the sample.

7. The system of claim 1 wherein clustering the samples includes performing multiple rounds of k-means clustering and selecting as output those clusters with consistent membership across the multiple rounds.

8. The system of claim 1 wherein determining the set of similarities includes determining a portion of metadata that is present in all members of the first cluster.

9. The system of claim 8 wherein evaluating the similarities includes comparing a size of the first cluster to a number of samples in a corpus that also includes the portion of metadata.

10. The system of claim 1 wherein the processor is further configured to iteratively perform the clustering, determining, and evaluating until a low quality threshold is reached.

11. The system of claim 10 wherein the processor is further configured to exclude metadata associated with samples for which malware signatures were assigned in a previous iteration, prior to performing a current iteration.

12. The system of claim 1 wherein the processor is further configured to provide as output a list of malware samples matching the malware family signature.

13. A method, comprising:
receiving a set of metadata associated with a plurality of samples;
clustering the samples;
determining, for members of a first cluster, a set of similarities shared among at least a portion of the members of the first cluster;
evaluating the similarities for suitability as a malware family signature, wherein suitability is evaluated based at least in part on how well the similarities uniquely identify the members of the first cluster; and
generating the malware family signature, including by generating one or more rules using at least a portion of the set of similarities and validating rule quality.

14. The method of claim 13 further comprising assigning weights to a set of tokens.

15. The method of claim 14 wherein the weights are assigned using term frequency-inverse document frequency analysis.

16. The method of claim 13 further comprising generating a vector list that indicates, for a given sample, a set of tokens hit by the sample.

17. The method of claim 13 wherein clustering the samples includes performing multiple rounds of k-means clustering and selecting as output those clusters with consistent membership across the multiple rounds.

18. The method of claim 13 further comprising providing as output a list of malware samples matching the malware family signature.

19. The method of claim 13 further comprising determining, for a first sample included in the plurality of samples, a set of features comprising name-value pairs.

20. The method of claim 19 wherein determining the set of features includes performing a tokenization.

21. The method of claim 13 wherein determining the set of similarities includes determining a portion of metadata that is present in all members of the first cluster.

22. The method of claim 21 wherein evaluating the similarities includes comparing a size of the first cluster to a number of samples in a corpus that also includes the portion of metadata.

23. The method of claim 13 further comprising iteratively performing the clustering, determining, and evaluating until a low quality threshold is reached.

24. The method of claim 23 further comprising excluding metadata associated with samples for which malware signatures were assigned in a previous iteration, prior to performing a current iteration.

25. A computer program product embodied in a computer readable storage memory and comprising computer instructions for:
receiving a set of metadata associated with a plurality of samples;
clustering the samples;
determining, for members of a first cluster, a set of similarities shared among at least a portion of the members of the first cluster;
evaluating the similarities for suitability as a malware family signature, wherein suitability is evaluated based at least in part on how well the similarities uniquely identify the members of the first cluster; and
generating the malware family signature, including by generating one or more rules using at least a portion of the set of similarities and validating rule quality.

* * * * *